(12) United States Patent
Floresta et al.

(10) Patent No.: US 7,456,593 B1
(45) Date of Patent: Nov. 25, 2008

(54) DIRECT DRIVE TRANSPORT SYSTEM

(75) Inventors: John Floresta, Commack, NY (US);
Chris Stollberger, Smithtown, NY (US); Claude Chirignan, Hauppauge, NY (US); Stephen R. Safranek, Shoreham, NY (US); Frederick A. Sommerhalter, Jr., Oyster Bay, NY (US)

(73) Assignee: Anorad Corporation, Shirley, NY (US)

( * ) Notice: Subject to any disclaimer, the term of this patent is extended or adjusted under 35 U.S.C. 154(b) by 288 days.

(21) Appl. No.: 11/279,219

(22) Filed: Apr. 10, 2006

(51) Int. Cl.
*H02K 41/00* (2006.01)
(52) U.S. Cl. .................. 318/135; 318/567; 318/569
(58) Field of Classification Search .................. 318/135, 318/567, 569, 560
See application file for complete search history.

(56) References Cited

U.S. PATENT DOCUMENTS

| | | | |
|---|---|---|---|
| 4,841,869 A | 6/1989 | Takeuchi et al. | |
| 5,023,495 A | 6/1991 | Ohsaka et al. | |
| 5,205,395 A * | 4/1993 | Bruno et al. | 198/389 |
| 5,896,031 A * | 4/1999 | King | 324/225 |
| 5,925,943 A | 7/1999 | Chitayat | |
| 5,936,319 A | 8/1999 | Chitayat | |
| 5,942,817 A | 8/1999 | Chitayat | |
| 5,965,963 A | 10/1999 | Chitayat | |
| 5,977,664 A | 11/1999 | Chitayat | |
| 5,994,798 A | 11/1999 | Chitayat | |
| 6,101,952 A | 8/2000 | Thornton et al. | |
| 6,191,507 B1 | 2/2001 | Peltier et al. | |
| 6,274,952 B1 | 8/2001 | Chitayat | |
| 6,713,902 B2 | 3/2004 | Chitayat | |
| 2002/0024979 A1 * | 2/2002 | Vilhelmsson et al. | 372/20 |

* cited by examiner

*Primary Examiner*—Karen Masih
(74) *Attorney, Agent, or Firm*—Amin Turocy & Calvin LLP; Alexander R. Kuszewski

(57) ABSTRACT

A system, method and apparatus for controlling a linear stage a pallet is described herein. In one aspect, a conveyor system includes a conveyor pallet that includes a first mobile magnetic component and a second mobile magnetic component. A first stationary magnetic component can magnetically engage the first mobile magnetic component. A second stationary magnetic component can magnetically engage the second mobile magnetic component. A first controller can activate a first magnetic displacement between the first stationary magnetic component and the first mobile magnetic component when the conveyor pallet is in a first range of positions. A second controller can activate a second magnetic displacement between the second stationary magnetic component and the second mobile magnetic component when the conveyor pallet is in a second range of positions.

27 Claims, 11 Drawing Sheets

DIRECT DRIVE TRANSPORT SYSTEM

TECHNICAL FIELD

The following description relates generally to a control configuration scheme for linear motors, with particular applicability to a control configuration for a conveyor system.

BACKGROUND

In the field of conveyor systems, moving chains or cables are utilized as a drive system for pulling conveyor carts or pallets through a number of conveyor stations where various manufacturing or other process operations are performed. However, chain or cable-driven systems generally must move along at a constant rate and the conveyor speed is therefore limited to the slowest rate utilized in the system. To overcome this problem, established independent control over the pallet can be utilized to accelerate the pallet into and out of each station, thereby reducing conveyor time.

Independent pallet control can be achieved through utilization of a linear motor driven system, thereby avoiding moving cables or chains. In a standard linear motor, an arrangement of stationary electromagnetic coil assemblies are configured to interact with a magnet assembly attached to a linear stage, e.g. the underside of a moving conveyor pallet. When the coil assemblies are energized, a magnetic force is imparted to the magnet assembly, which displaces the linear stage, thereby moving conveyor pallet. By controlling the application of current to the coils, each pallet can be controlled individually, with an infinite range of independent control over the speed and position of the pallet.

In a typical linear motor application, infinite independent control can be obtained by using a feedback system to sense the position of the stage, and in response to the position, commutating the independent stationary coils (e.g., turning the coils on and off in a coordinated control scheme) in order to control the speed and position of each pallet. This type of control scheme can give infinite control of the stage over the entire length of travel. However, this results in a very complex and difficult control scheme.

For example, a relatively small linear motor conveyor system having a twenty-five foot oval track would require twenty-five feet of coils. Each coil is about three inches in diameter, thus, a twenty-five foot section utilizes about one hundred coils. In order to establish independent control over four pallets moving through the conveyor, it would be necessary to sense the position of each pallet at all times and commutate the proper coils at the right times to obtain the desired motion and speed. Over a twenty-five foot curved path of travel, numerous sensors would be needed and switching devices would be required for each of the one hundred independent coils. A very complex control scheme would be necessary to implement such a system and would be inherently less reliable and more expensive because of the number of switching devices needed to control every independent coil.

While the benefits of linear motor conveyor systems are evident, the expense, reliability and maintenance issues associated with these systems have prevented their wholesale penetration into the conveyor market. In comparison, conventional chains and cables are very inexpensive, about one dollar per foot. So while many businesses that use conveyor systems would like to obtain the benefits of a linear motor drive, the expense and reliability factors have made conversion undesirable and in some cases prohibitive.

SUMMARY

The following presents a simplified summary of the disclosed embodiments in order to provide a basic understanding of some aspects described herein. This summary is not an extensive overview, and is not intended to identify key or critical elements or to delineate the scope of the various embodiments. Its sole purpose is to present some concepts in a simplified form as a prelude to the more detailed description that is presented later.

A system, method and apparatus for controlling a linear stage is described herein. In one aspect, a linear stage includes a first mobile magnetic component and a second mobile magnetic component. A first stationary magnetic component can magnetically engage the first mobile magnetic component. A second stationary magnetic component can magnetically engage the second mobile magnetic component. A first controller can activate a first magnetic displacement between the first stationary magnetic component and the first mobile magnetic component when the linear stage is in a first range of positions. A second controller can activate a second magnetic displacement between the second stationary magnetic component and the second mobile magnetic component when the linear stage is in a second range of positions.

In another exemplary aspect, the first and second stationary magnetic components can be elongated, parallel members. The first mobile magnetic component can be mounted to the linear stage and can movably engage the first stationary magnetic component. Similarly, the second mobile magnetic component can movably engage the second stationary magnetic component. The first and second stationary components can be longitudinally displaced so that the second stationary magnetic component has an entry end that receives the second mobile magnetic component, substantially co-extensive with an exit end for the first mobile magnetic component from the first stationary magnetic component. A position sensor can be provided that measures the position of the linear stage with respect to the first and second ranges of positions. The position sensor can communicate stage position to the first and second controllers.

In accordance with another aspect, a master controller can control the first and second controllers. The first controller can be configured to deactivate the first magnetic displacement when the position sensor indicates a stage position where the second mobile magnetic component engages the second stationary magnetic component. When this stage position is detected, the master controller can configure the second controller to activate the second magnetic displacement In accordance with another aspect, the control system for the linear stage can be employed in a conveyor system that can include a conveyor pallet that has a first magnet and a second magnet. A first coil component can engage the first magnet and a second coil component can engage the second magnet. The second coil component can be offset from the first coil component. A first controller can electromagnetically activate the first coil component to impart a magnetic displacement to the first magnet while a second controller can electromagnetically activate the second coil component to impart a magnetic displacement to the second magnet.

In accordance with another aspect, master controller can configure the first controller to deactivate the first coil component when the second magnet engages the second coil component. The master controller can also configure the second controller to activate the second coil component upon engagement of the second magnet with the second coil. A position sensor can measure the position of the conveyor pallet and communicate pallet position to the first and second controllers.

In accordance with another aspect is a conveyor station that can be a subcomponent of an overall conveyor system. The station can include a first coil component that engages a first magnet mounted on a conveyor pallet. The first coil component can be elongated and include an entry end and an exit end for the first magnet. A second coil component can engage a second magnet mounted on the conveyor pallet. The second coil component can be elongated and include an entry end and an exit end for the second magnet. The first and second coil components can be aligned in a parallel, longitudinally-displaced relationship in such a way that the second coil component entry end is substantially co-extensive with the first coil component exit end. A first controller can electromagnetically activate the first coil component to impart a magnetic displacement to the conveyor pallet through the first magnet. In a similar manner, a second controller can electromagnetically activate the second coil component to impart a magnetic displacement to conveyor pallet through the second magnet.

In accordance with another aspect is a method of conveyor operation. The method can include conveying a pallet into a station. The method further includes engaging a first magnet mounted on the pallet with a first stationary coil. The first stationary coil can be activated to magnetically displace the pallet through the first magnet. The pallet position can be indexed to one or more process positions using the first stationary coil. The method further includes engaging a second magnet mounted on the pallet with a second stationary coil. The first stationary coil is deactivated, whereupon the second stationary coil is activated to magnetically displace the pallet through the second magnet.

To the accomplishment of the foregoing and related ends, various illustrative aspects are described herein in connection with the following description and the annexed drawings. These aspects are indicative, however, of but a few of the various ways in which the principles of the disclosed embodiments can be employed, and such matter is intended to include all such aspects and their equivalents. Other advantages and novel features will become apparent from the following detailed description when considered in conjunction with the drawings.

DETAILED DESCRIPTION

Figure 1:
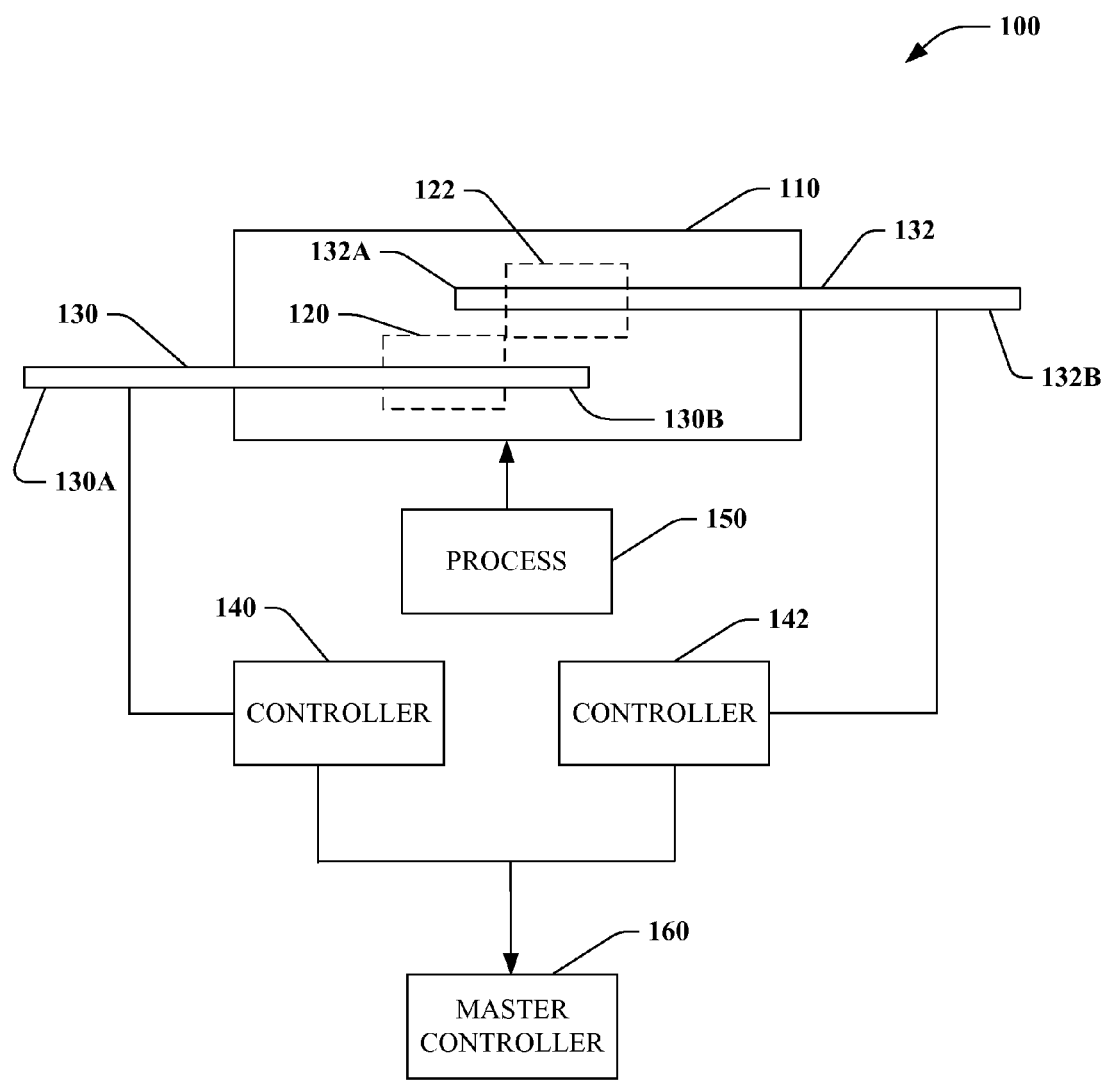
FIG. 1 is a high-level system diagram of a control system for localized precision control of a linear stage.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that some embodiments can be practiced without these specific details. In other instances, well-known structures and devices are shown in block diagram form in order to facilitate describing the various embodiments.

Furthermore, the one or more embodiments may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

A control system for a linear stage 100 in accordance with various embodiments is shown in FIG. 1. The linear stage 110 includes a first mobile magnetic component 120 and a second mobile magnetic component 122. A first stationary magnetic component 130 can be utilized to magnetically engage the first mobile magnetic component 120. A second stationary magnetic component 132 can be utilized to magnetically engage the second mobile magnetic component 122. In an exemplary aspect of the subject system, the first and second mobile magnetic components 120, 122 are permanent magnet assemblies, and are mounted to the underside of the linear stage 110. Also in this exemplary aspect, the first and second stationary magnetic components 130, 132 are electromagnetic coil assemblies. When an electrical current is applied to the first and second stationary magnetic components 130, 132, a magnetic force is applied to the first and second mobile magnetic components 120, 122, thereby resulting in a magnetic displacement of the stage 110. However, in accordance with some embodiments, the first and second stationary magnetic components 130, 132 can alternatively be permanent magnets while the first and second mobile magnetic components 120, 122 can be electromagnetic coil assemblies. The application of a current to the mobile magnetic components 120, 122 can produce the magnetic force that results in the magnetic displacement of the stage 110. However, it should be understood that these and other variations can be made without departing from the scope of the detailed description.

A first controller 140 can activate the first magnetic displacement between the first stationary magnetic component 130 and the first mobile magnetic component 120 when the linear stage 110 is in a first range of positions (as will be discussed in greater detail below in connection with aspects illustrated in FIGS. 3-6). A second controller 142 can activate a second magnetic displacement between the second stationary magnetic component 132 and the second mobile magnetic component 122 when the conveyor pallet 110 is in a second range of positions (as will be discussed in greater detail below in connection with aspects illustrated in FIGS. 5 and 6). The first and second controllers 140, 142 can control the amount of current flow and hence the magnitude of magnetic force that displaces the linear stage 110. In this way, the stage 110 can be precisely positioned to execute a process 150 that occurs at the particular station. A master controller 160 can be configured to vary the operation of the first and second controllers 140, 142, and can perform a hand-off between the stationary magnetic components 130, 132, as will be set forth in greater detail below.

As is shown in FIG. 1 and related figures, the first and second stationary magnetic components 130, 132 can be elongated, parallel members. It is to be appreciated that these stationary magnetic components 130, 132 can include a longitudinal array of electromagnetic coils, each having a dedicated switch that can enable each to be commutated in a manner that allows for a more precise application of magnetic force to the respective mobile magnets 120, 122, and can produce an infinite range of independent, controlled displacement of the linear stage 110. Alternatively, in a simpler arrangement, the coils can be commutated at substantially the same time to apply a uniform magnetic force to the mobile magnets 120, 121.

As indicated in FIG. 1, the first mobile magnetic component 120 can be mounted on the underside of the linear stage 110, to movably engage the first stationary magnetic component 130. Similarly, the second mobile magnetic component 122 can movably engage the second stationary magnetic component 132. The mobile magnetic components 120, 122 can be formed of an inverted U-shaped channel that rides over the top of the stationary magnetic components 130, 132. It should be understood that many other different magnet configurations are possible, including a flat plate configuration, or any other suitable configuration that could be contemplated. The mobile components 120, 122 do not need to make direct mechanical contact with the elongated stationary components 130, 132. The linear stage 110 can be supported by casters or rollers (not shown) that support the weight of the stage 110 as it moves through the conveyor system 100.

The first and second stationary magnetic components 130, 132 can be longitudinally displaced. The first stationary magnetic component 130 has an entry end 130A that receives the first mobile magnetic component 120 and an exit end 130B for discharging the first mobile magnetic component 120. The second stationary magnetic component 132 has an entry end 132A that receives the second mobile magnetic component 122 and an exit end 132B that discharges the second mobile magnetic component 122. The entry end 132A of the second stationary component 132 can be substantially co-extensive with the exit end 130B of the first stationary magnetic component 130. In this way, the linear stage 110 can be magnetically displaced during the extent in which the first mobile magnetic component 120 is engaged by the first stationary magnetic component 130, while activated by the first controller 140. As the first mobile magnetic component 120 reaches the exit end 130B, the second mobile magnetic component 122 engages the entry end 132A of the second stationary magnetic component 132. At this hand-off point, the master controller 160 can instruct the first controller 140 to deactivate the first stationary magnetic component 130, and can instruct the second controller 142 to activate the second stationary magnetic component 132. At that point, the linear stage 110 is magnetically displaced along the extent that the second mobile magnetic component 122 is engaged by the second stationary magnetic component 132. It is to be appreciated that the first stationary magnetic coil 130 can be of sufficient length to accommodate a single linear stage. However, the first stationary magnetic component 130 can be extended to any indeterminate length to simultaneously engage mobile magnetic components of a second, third or any desired or predetermined number of linear stages. In this way, multiple linear stages can be driven in unison by the first stationary magnetic component 130. Each linear stage would be taken off one at a time in turn upon reaching the second stationary magnetic component 132.

The subject control system has particular applicability in controlling a linear stage used with a conveyor pallet in a conveyor system. The pallet can be utilized for carrying one or more articles along a number of stations on a conveyor, through a manufacturing or other process environment. However, it is to be appreciated that the subject system has applicability with any suitable linear stage. The subject control system is especially applicable in any scheme where the magnet is lighter than the coil, such that the magnets are mounted on and displaced by the linear stage, and no moving cables are employed. By way of example and not limitation, the subject control system can be with a linear stage used in the manufacture of printed circuit boards (PCBs), e.g. for PCB drilling and inspection, where lightweight PCBs are quickly accelerated and stopped for performing various drilling operations and inspections. The subject control system can be used in a single-axis application, where displacement is controlled in a single X-direction, or can also be used in a dual-axis application, where displacement is controlled in X- and Y-directions. Any other suitable arrangement could also be contemplated without departing from the innovative concept.

Figure 2:
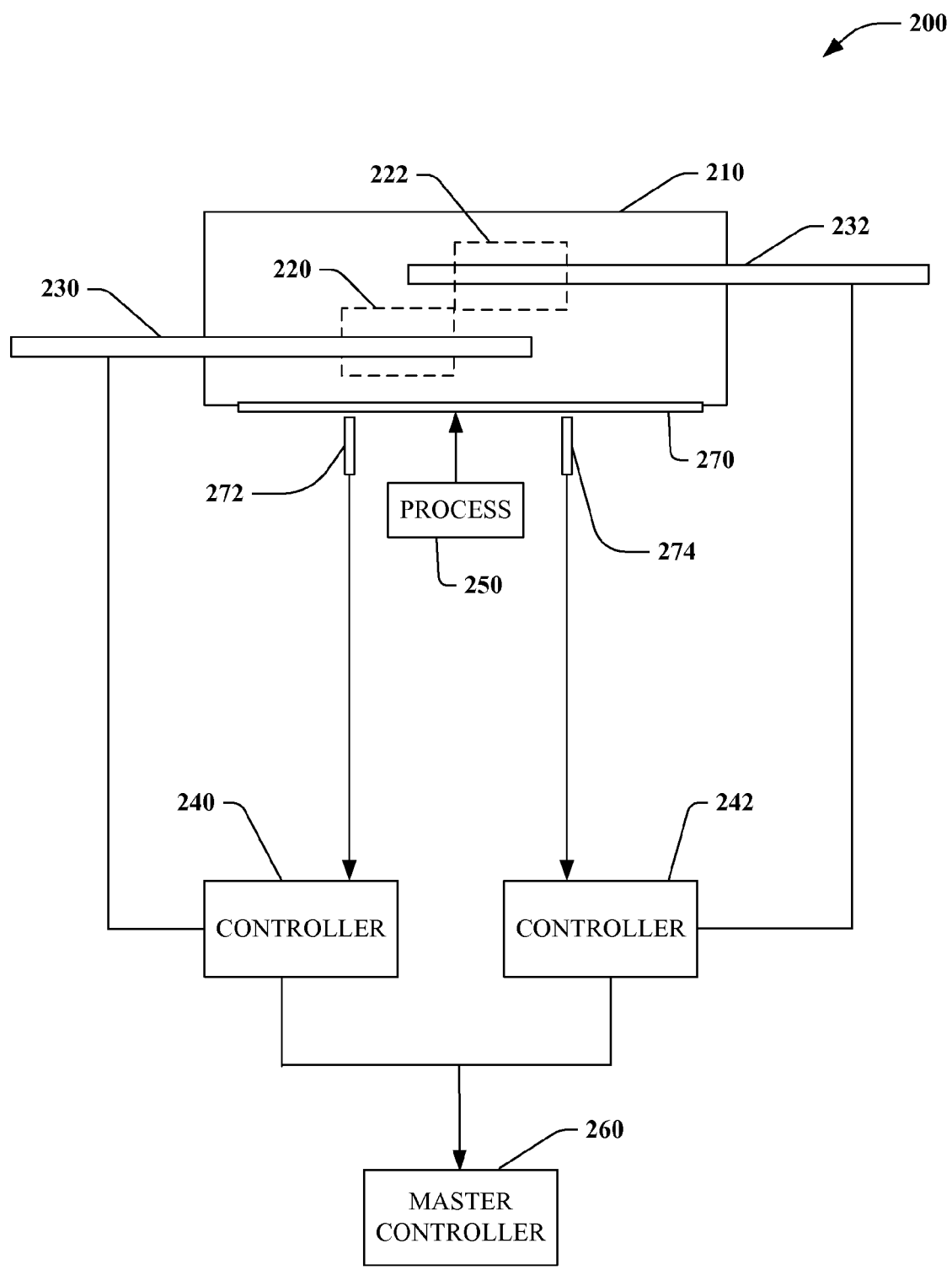
FIG. 2 is a system diagram of a conveyor system including a position sensor that cooperates with a master controller.

Turning now to FIG. 2, the subject control system is shown as used with a conveyor system 200 for magnetically displacing a conveyor pallet 210. A conveyor pallet 210 includes a first mobile magnet 220 and a second mobile magnet 222, which can be permanent magnets mounted to the underside of the pallet 210. A first stationary magnetic coil 230 can be energized to magnetically engage the first mobile magnet 220. The first controller 240 can be activated to supply electricity to the first stationary magnetic coil 230, to apply a magnetic force to the first mobile magnet 220 when the conveyor pallet 210 is in a first range of positions, corresponding to the length of the elongated first coil 230. A second stationary magnetic coil 232 can be energized to magnetically engage the second mobile magnetic component 222. A second controller 242 can activate the second stationary magnetic coil 232, applying electrical current resulting in magnetic displacement to the second mobile magnet 222 when the conveyor pallet 210 is in a second range of positions along the length of the elongated second coil 232. The pallet 210 can thereby be positioned to execute the process 250 at the particular conveyor station.

The master controller 260 can control the operation of the first and second controllers 240, 242 to perform a hand-off between the elongated stationary magnetic coils 230, 232. In order to detect the pallet position, to perform the hand-off, a feedback device can be used that indicates the position of the pallet 210 to the controllers 240, 242. The feedback device can be a position sensor arrangement that measures the position of the conveyor pallet 210 with respect to the first and second ranges of positions. The position sensor arrangement communicates pallet position to the first and second controllers 240, 242. An exemplary position sensor is an encoder system that measures a longitudinal displacement of the conveyor pallet along the first and second stationary magnetic components. It is to be appreciated that the position sensor can alternatively be any suitable type of sensor, such as a Hall Effect sensor that measures position by detecting changes in a magnetic field. In some embodiments, the position sensor can be an encoder system that includes a scale portion 270 mounted on the conveyor pallet 210 and a plurality of stationary-mounted reader heads that read the scale.

As illustrated, a first reader head 272 reads the scale 270 and communicates the reading to first controller 240, and a second reader head 274 reads the scale 270 and communicates the reading to the second controller 242. The scale 270 can be a plurality of finely-ruled tick marks, correlated to the known length of the pallet 210. Thus, knowledge of the pallet position can be obtained. The master controller 260 can control the first and second controllers 240, 242 based on position readings from the reader heads 272, 274. It should be appreciated that the encoder can any type of encoder, including an optical encoder for optically reading visual or other such indicia. The encoder can also be magnetic, capacitive or inductive, more measuring changes in position by sensing changes in those respective electromagnetic properties. In any event, the respective position sensor in the encoder can communicate over wires to its respective controller, or it can communicate a wireless signal to an antenna at its controller. In view of the above, the system can obtain knowledge of pallet position, thereby giving independent control of the pallet by a controlled application of magnetic displacement through the coils 230, 232.

By way of example and not limitation, the conveyor may be used to fill items into a bag for retail sale. A first station may be used to dispense a bag onto the pallet. At a second station, three feet away, the bag may be filled. A third station, another three feet away, may be used to seal the bag. At a fourth station, three feet beyond, the bags may be loaded into a box. Alternatively, several operations may be performed at a single station, where the pallet 110 is indexed from one position to the next within the station. Multiple bags may be dispensed and positioned onto the pallet at the first station, and multiple fill and sealing operations may be performed respectively at the second and third stations. However, it should be appreciated that the subject control configuration could be used with any suitable linear stage application, and is no way limited to a conveyor or other type of material transport system.

A typical material transport application may not require infinite, independent control of the pallets over the entire length of travel of the conveyor system, (e.g., a 25 foot oval). Precision control of the pallet position might be necessary in conveyor stations where the process operations occur. In between the stations, it would be sufficient to use a standard conveyor chain, cable, belt, or the like. Such a standard system is much simpler and less expensive since coil assemblies and the associated switching devices and controllers are only installed in the conveyor stations where the precision control is desired. In this way, the illustrated system provides a simpler or more reliable scheme by using standard stationary coil modules over a short length in an area of interest, where the modules can be commutated in unison using standard amplifiers and motion controllers. Therefore, it is an additional aspect of the disclosed embodiments to include a conveyor station that can be a part of an overall conveyor system.

Figure 3:
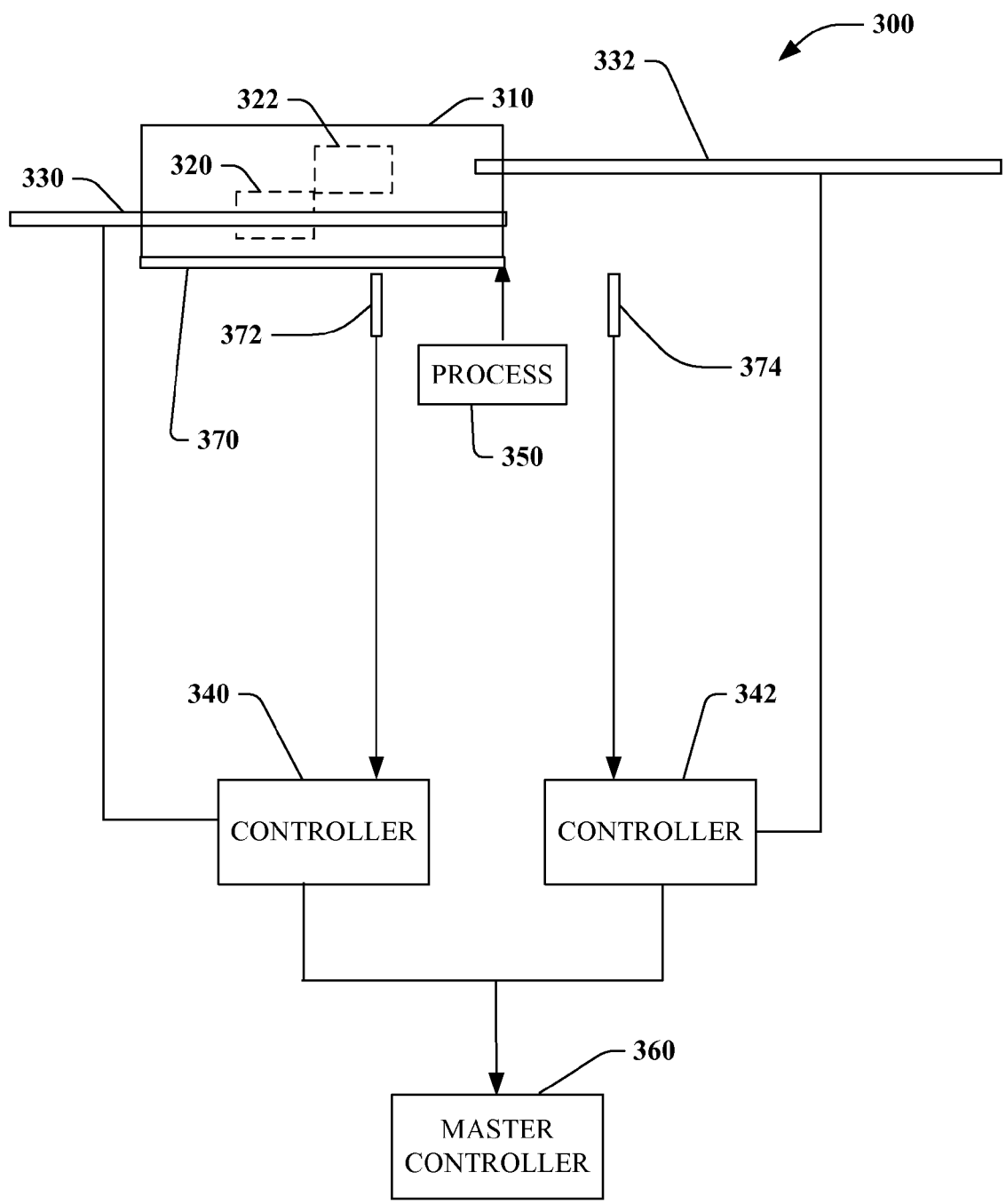
FIG. 3 illustrates a first stage in the operation of the subject linear motor conveyor system in which pallet control is executed with the first stationary component.

The operation of the claimed system will be explained with reference to FIGS. 3-6. As shown in FIG. 3, a conveyor station 300 includes a first coil component 330 that engages a first magnet 320 mounted on a conveyor pallet 310, similar to the system described in the above figures. As the pallet 310 enters the station 300, the first coil component 330 can be electrically energized by the first controller 340 enabling movement of to the pallet 310 by applying a magnetic force to the first magnet 320. It is to be appreciated that the first and second coil components 330, 332 can each be connected to their own amplifiers (not shown) for providing sufficient electrical current. The amplifiers can be a standard type, such as a K6000 servo drive or an ULTRA 3000, both sold by Allen-Bradley Co. Inc. Of course, any suitable amplifier system could be used without departing from the scope of the various embodiments. An encoder scale 370 can be mounted on the side of the pallet 310 so that the position of the pallet 310 can be measured by counting tick marks on the scale 370. In the position shown in FIG. 3, the first read head 372 is reading the scale and communicating to the first controller 340. At this position, only the first magnet 320 is engaged and the second magnet 322 is not engaged, and performs no function at this time. The first controller 340 is then able to control the first coil 330 to precisely index the position of the pallet 310 to a desired location in order to carry out the process operation 350.

Figure 4:
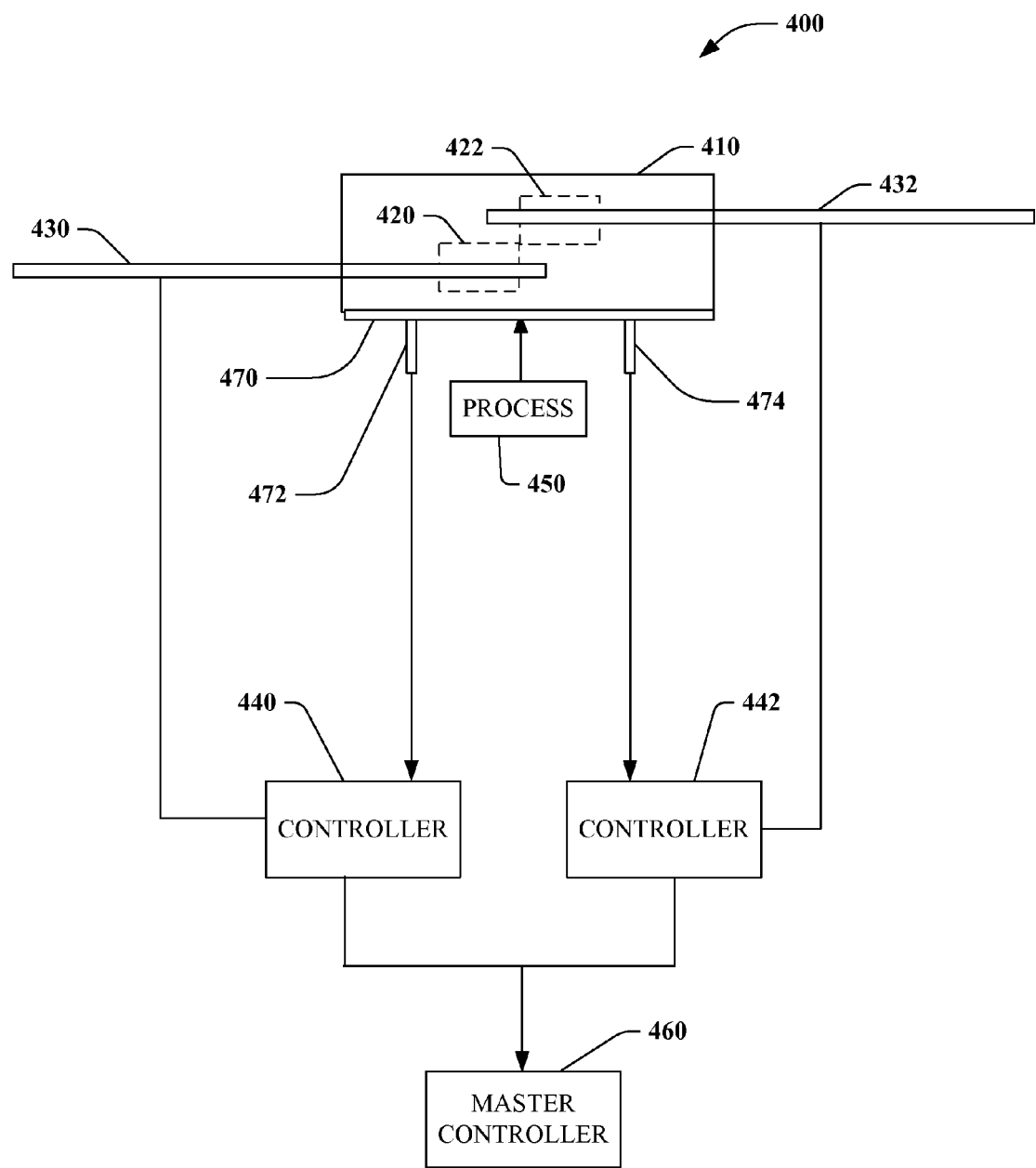
FIG. 4 illustrates a second stage in the operation of the subject linear motor conveyor system in which hand-off of pallet control is made from the first stationary component to the second stationary component.

FIG. 4 shows the conveyor station 400 with the conveyor pallet 410 indexed to a second operative position. At this position, the first coil component 430 is driving the pallet 410 through the first magnet 420. The second magnet 422 has come into physical engagement with the entry end of the second coil component 432, though no magnetic force is being generated there between. The second read head 474 is reading tick marks from the encoder scale 470 and communicating the readings to the second controller 442. At this point, a hand-off is performed where essentially the first coil 430 is deactivated and the second coil 432 is activated. The transfer of control is performed by transferring knowledge of position from the first and second controllers 440, 442, to perform a coordinate system transformation from the coordinate system of the first coil 430 to the coordinate system of the second coil 432. At the hand-off position, the first read head 472 has recorded a specific tick mark from the encoder scale 470 (e.g. mark 1000). The second read head 472 is reading a different tick mark (e.g. mark 100). Since both controllers 440, 442 are actively reading their respective read heads 472, 474, the master controller 460 reads these positions and accounts for the differences to calibrate the position of the second read head 474 with that of the first read head 472. At that point, with a known offset between the read heads 472, 474, the second coil 432 can take control of the pallet 410 and index the position to the next process position. The master controller 460 instructs the first controller 440 to deactivate the first coil component 420, and then instructs the second controller 442 to activate the second coil component 422, thereby accomplishing a hand-off of control.

The first, second and master controllers 440, 442, 460 can each be separate control components, or they can be incorporated into a multi-access control component, so that a first access can function as the first controller 440, and a second access can function as the second controller 442. A single multi-access controller offers the benefits of closer coordination between the operations of each individual coil. It also facilitates communication from the encoders and their respective controllers. However, it is to be appreciated that any suitable controller could be used with the disclosed embodiments.

Figure 5:
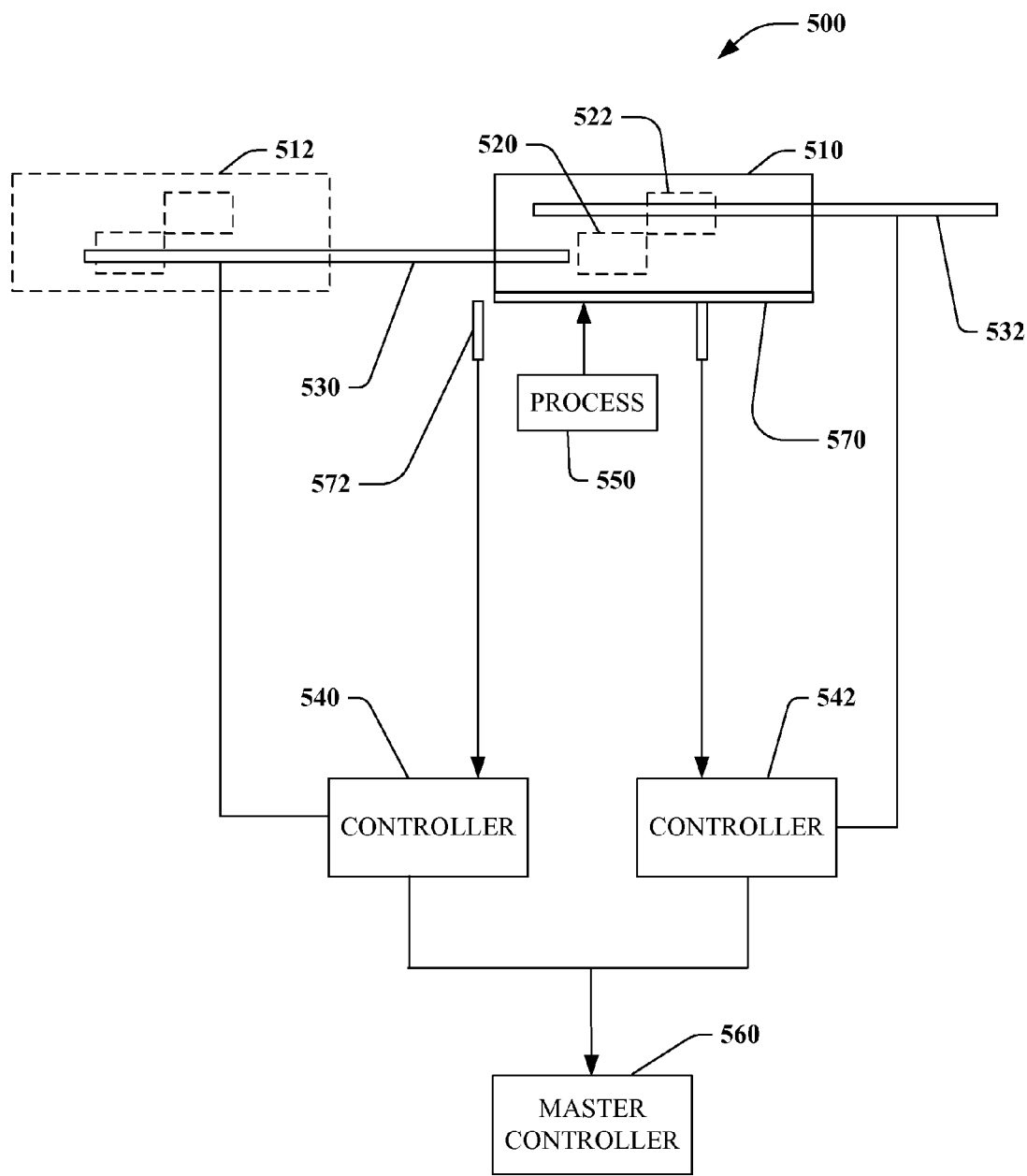
FIG. 5 illustrates a third stage in the operation of the subject linear motor conveyor system in which pallet control is executed with the second stationary component as control of a second pallet is executed with the first stationary component.

As shown in FIG. 5, the second coil component 532 applies force to the second magnet 522 to take control of the pallet 510. The second controller 542 can then direct the second coil 532 to index the pallet 510 along to the next positions needed for the process 550 at the conveyor station 500. When the first magnet 520 is fully disengaged from the first coil 530, the first coil 530 is available to load a second pallet 512. At substantially the same time as the first magnet of the second pallet 512 comes into engagement with the first coil 530, the first controller 540 can be activated and the first and second controllers 540, 542 can each take control of their own conveyor pallets 510, 512, with minimal interference. It is to be appreciated that the first and second coils 530, 532 should not be activated at the same time when both magnets of the single pallet are engaged, since the operations of each coil might interfere with each other. However, according to some embodiments, two or more pallets can be simultaneously handled by the conveyor system, provided only a single respective magnet on each of the pallets is engaged with a coil component.

Since the encoder system provides position information to the master controller 560, the two pallets 510, 512 can be quickly manipulated. The first pallet 510 can be rapidly removed by the second coil component 532 while the second pallet is quickly moved into position, thereby significantly reducing conveyance time and increasing the rate of production. Also, the master controller 560 can allow close coordination between the first and second controllers 540, 542, thereby facilitating collision avoidance between the pallets as they are handled.

Figure 6:
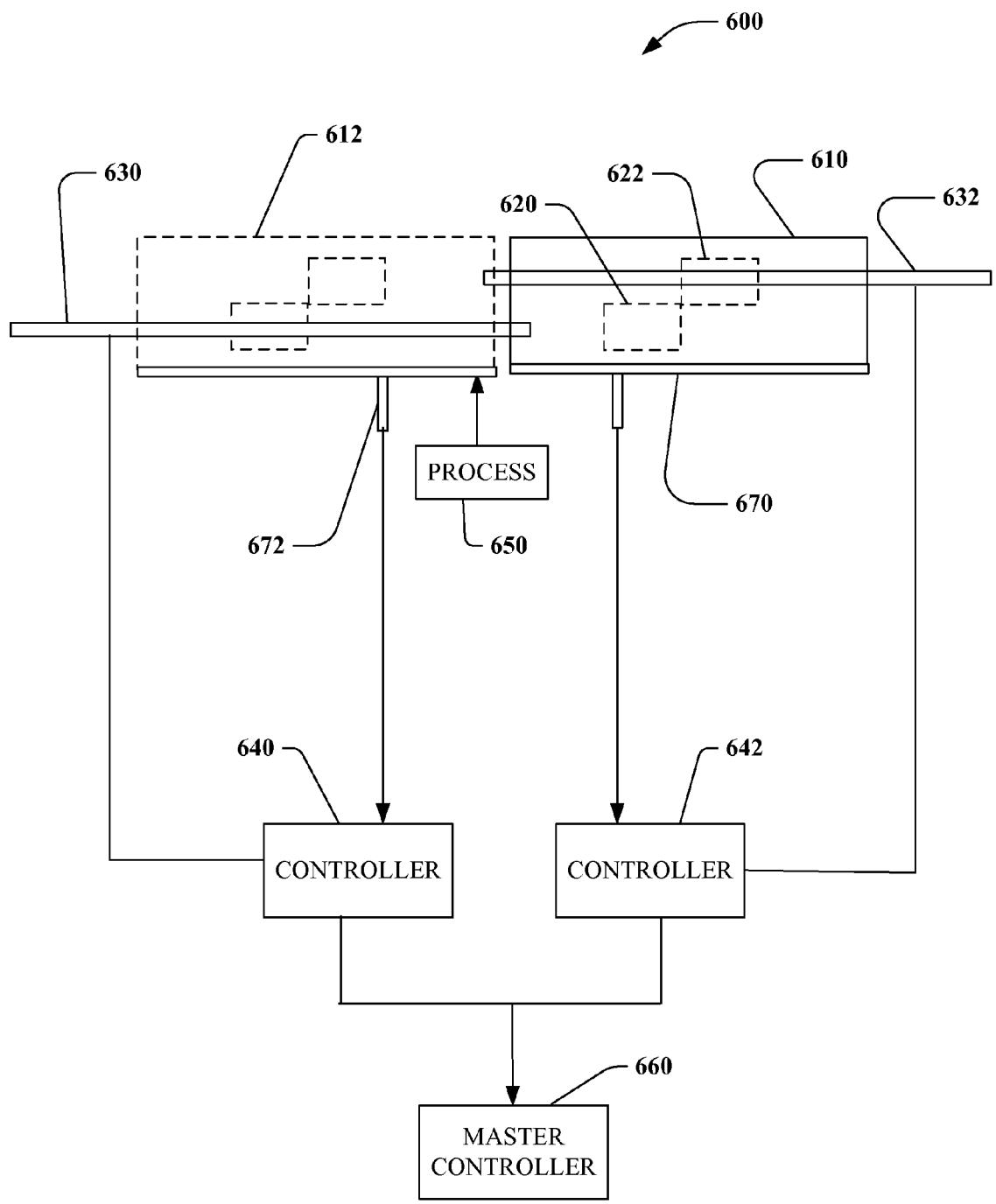
FIG. 6 illustrates a fourth stage in the operation of the subject linear motor conveyor system in which the position of the second pallet is indexed along the first stationary component as the first pallet is displaced by the second stationary component.

As shown in FIG. 6, while a last process can be performed on the first conveyor pallet 610, the second pallet 612 can be quickly and accurately pre-positioned along the first coil component 630 for registering with the first read head 672, as allowing it to be indexed through the station 600 for any processes 650 that can be performed. At this time, the second coil component 632 can quickly move the first pallet 610 out of the station while the second pallet 612 begins indexing, with no delay in throughput. In accordance with some embodiments, the benefits of independent control are achieved but only with the smaller additional expense associated with electronics and hand-off in the process stations where such precise control is actually required.

Figure 7:
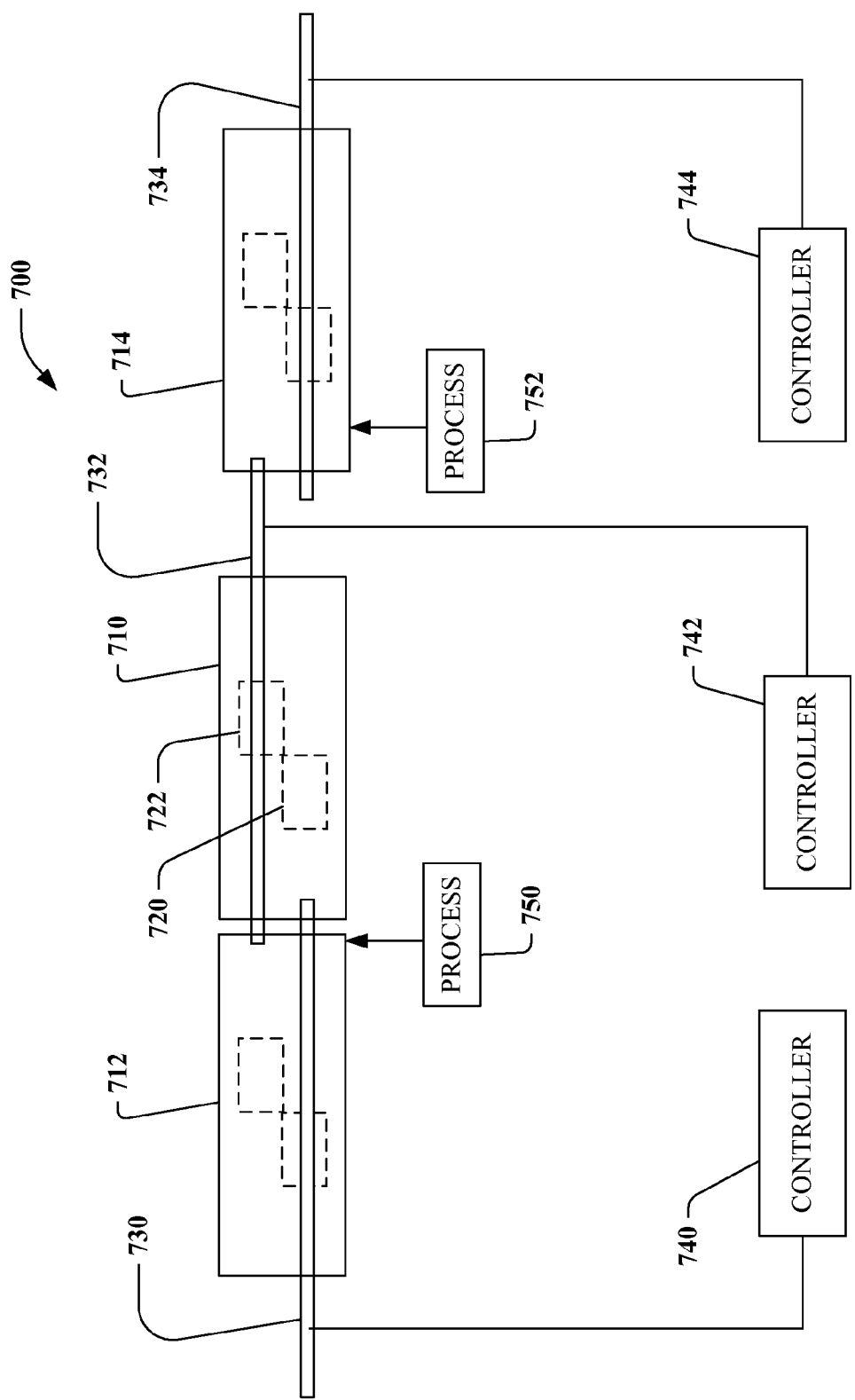
FIG. 7 illustrates an exemplary embodiment in which multiple stationary components are used to provide a greater range of controlled movement.

A further exemplary conveyor system 700 is shown in FIG. 7. The principle of the disclosed systems can be extended to include three stationary coil components 720, 722, 724. In a snapshot of the operation of this exemplary system, a pallet 710 can be moved along a second coil component 732, having earlier been indexed along the first coil component 730 where a first set of processes 750 had taken place. A downstream pallet 712 is currently being indexed along the first coil component 730, where the processes 750 are currently being performed. An upstream pallet 714 is also being indexed along a third coil component 734 where a second set of processes 752 are being performed. In this exemplary system, the second coil component 732 is shown as being used for rapid, controlled transport from the first coil 730 to the third coil 734. However, a separate set of processes could also be performed at this coil as well. Alternatively, a second set of processes could be performed along the second coil 732, and the third coil 734 can be used to eject the pallet. In any aspect, a first controller 740 can be used to control the operation of the first coil component 730. Similarly, a second controller 742 and a third controller 744 can be used to respectively control the operation of the second and third coil components 732, 734. It is to be appreciated that, in this exemplary embodiment, and encoder system is also employed for sending positional data back to the controllers 740, 742, 744.

Figure 8:
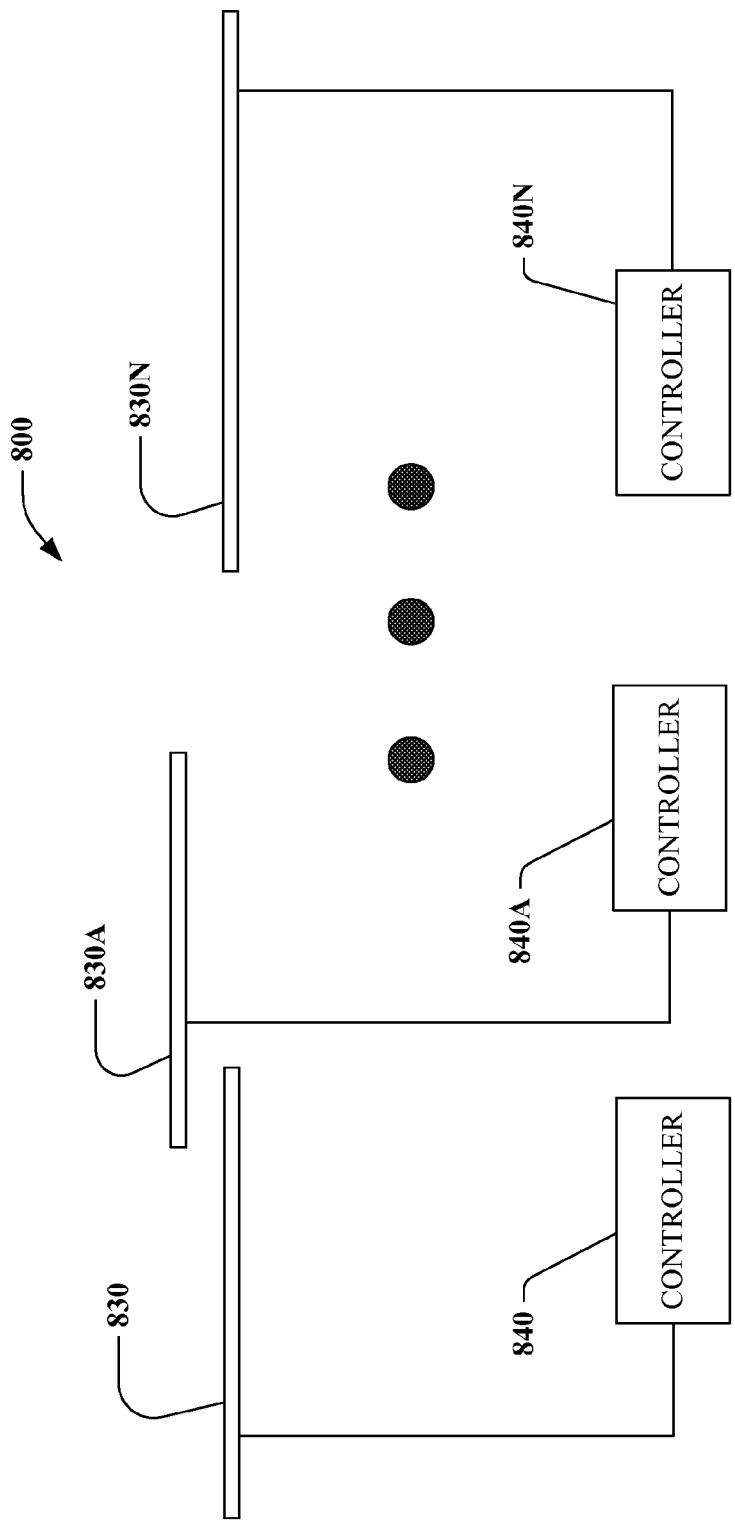

As illustrated in FIG. 8, a conveyor system 800 can be employed that applies the concept of using any number of multiple coils 830, 830A . . . 830N for any manner of controlled, independent handling of a conveyor pallet. It should also be appreciated that any number of coils 830, 830A . . . 830N can be utilized, as long as they are controlled by a respective number of controllers 840, 840A . . . 840N in accordance with the above description. It should also be appreciated that the system can be modular, and can be extended or customized as desired by using any number of standard coil module components. In one aspect, the coil modules over the entire length of a coil component can be energized at the same time, displacing a pallet, where a greater magnetic field accelerates the pallet, and a reversal of polarity is used to decelerate the pallet. In some embodiments, specific coil modules within the coil component can also be individually servo-controlled providing a localized magnetic field along the mobile magnetic components, and thereby increase control over the pallet.

Figure 9:
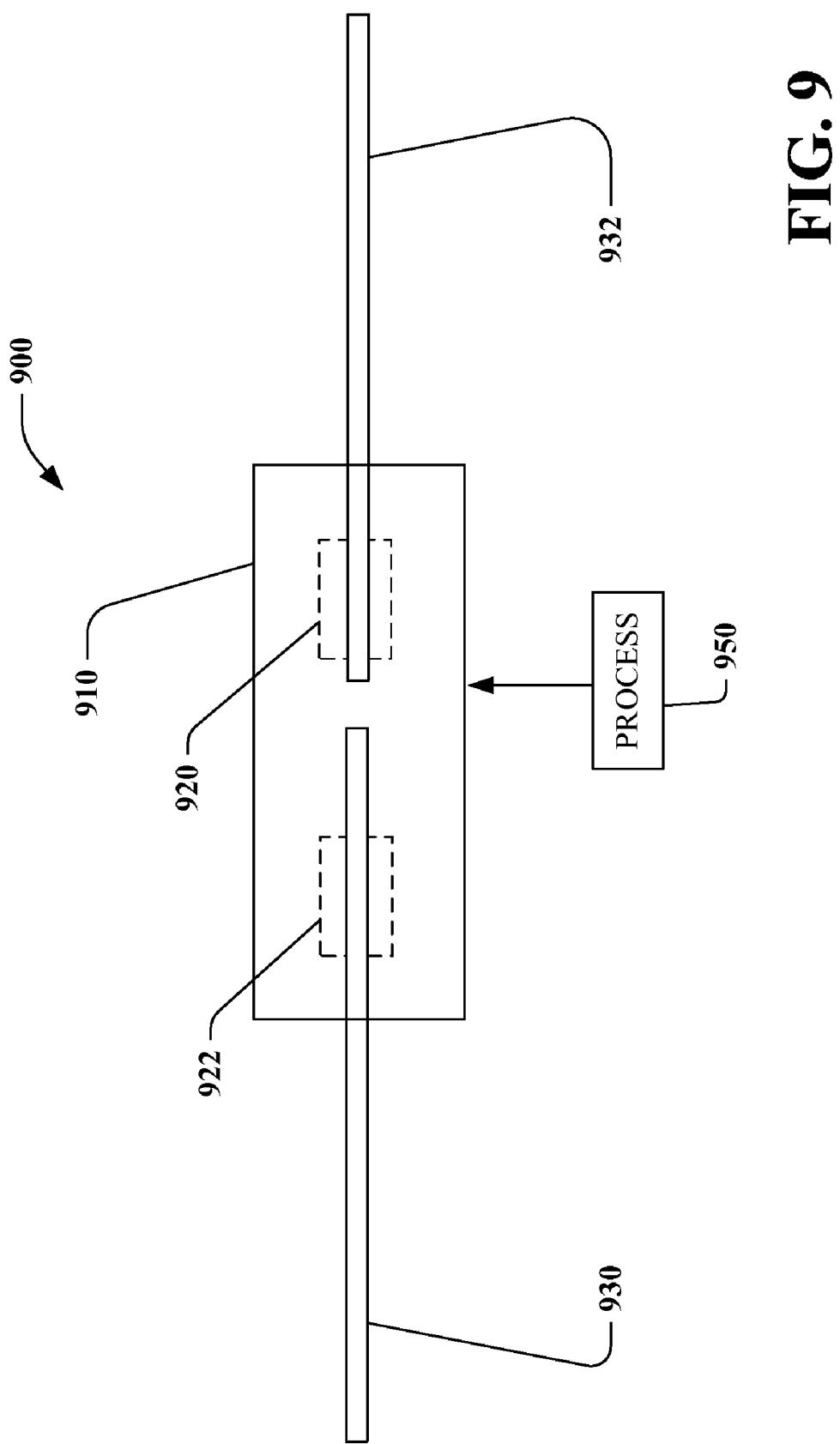
FIG. 9 illustrates an exemplary embodiment in which the first and second stationary components are linearly arranged.

FIG. 9 illustrates an exemplary system where the first stationary magnetic component 930 is in line with the second stationary magnetic component 932. In this scheme, a first mobile magnetic component 920 is displaced when the first stationary magnetic component 930 is activated. A second mobile magnetic component 922 is mounted in line with the first mobile component 920, so that the first stationary magnetic component 930 may grab both mobile magnets 920, 922. While the first mobile magnetic component 920 is being advanced to the second stationary component 932, the second mobile magnetic component 922 is being driven by the first stationary magnetic component 930, where it can be indexed to provide a process operation 950. At substantially the same time as the first mobile magnetic component 920 engages the second stationary component 932, the first stationary component 930 is deactivated and the second stationary component 932 is activated, thereby transferring operation from the first stationary component 930 to the second. In accordance with some embodiments, better control can be obtained by employing a servo-control on the coil modules, as discussed above, though such an arrangement might require a more complex control scheme.

Figure 10:
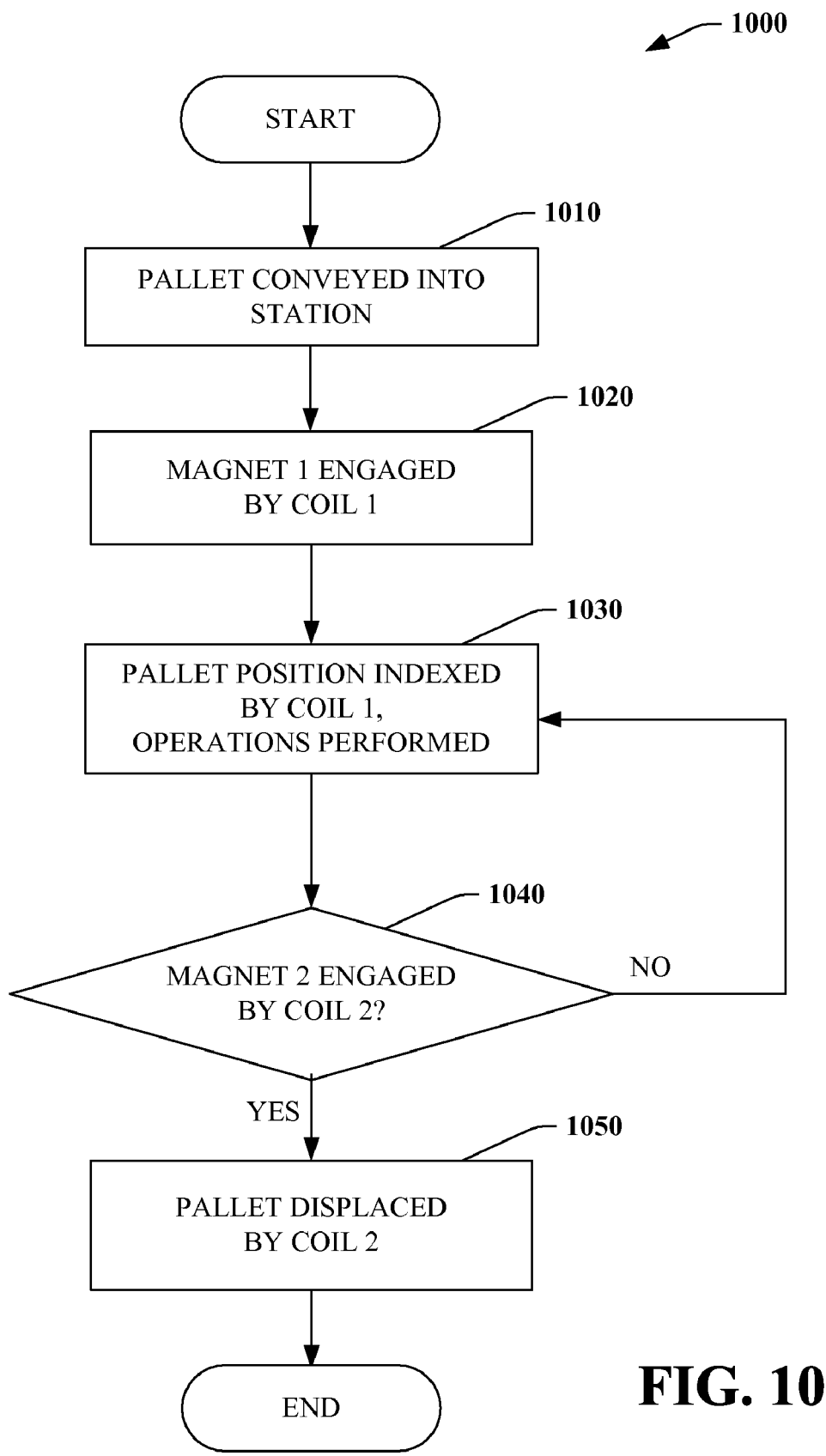
FIG. 10 is a flow chart of a methodology for conveyor operation according to the disclosed embodiments.

In view of the exemplary systems shown and described above, a methodology, which may be implemented in accordance with one or more aspects of the various embodiments, will be better appreciated with reference to the diagram of FIG. 10. While, for purposes of simplicity of explanation, the methodology is shown and described as a series of blocks it is to be understood and appreciated that the methodology is not limited by the order of blocks, as some blocks may, in accordance with this methodology, occur in different orders and/or concurrently with other blocks from that shown and described herein. Moreover, not all illustrated blocks may be required to implement a methodology in accordance with one or more aspects of the disclosed embodiments. It is to be appreciated that the various blocks may be implemented by software, hardware, a combination thereof or any other suitable means (e.g. device, system, process, component) for carrying out the functionality associated with the blocks. It is also to be appreciated that the blocks are merely to illustrate certain aspects presented herein in a simplified form and that these aspects may be illustrated by a lesser and/or greater number of blocks. Moreover, not all illustrated blocks may be required to implement the following methodology. Those skilled in the art will understand and appreciate that a methodology could alternatively be represented as a series of interrelated states or events, such as in a state diagram.

FIG. 10 illustrates a method 1000 of conveyor operation. The method includes conveying 1010 a pallet into a station. The conveying can be accomplished by using a conventional tow chain or cable, or can be used by any other method. A first mobile magnet, mounted on the pallet (e.g., the underside) is engaged 1020 by a first stationary coil. The engagement should be sufficient to impart a magnetic force to the pallet and mechanical contact might not be needed between the stationary coil and the mobile magnet. The first stationary coil is activated to magnetically displace the pallet through the first magnet. The pallet position is indexed 1030 along the length of the conveyor station through one or more process positions using the first stationary coil.

A determination 1040 is made whether the second magnet mounted on the pallet is engaged with a second stationary coil. The second stationary coil can be mounted in an offset manner so that its entry end is co-extensive with the exit end of the first coil. The second mobile magnet is mounted in an offset manner to correspond with the second stationary coil. If the determination 1040 indicates NO, the indexing 1030 of the pallet continues. If the determination 1040 indicates that the second magnet is engaged 1040 with the second stationary coil (YES), the first stationary coil is deactivated, whereupon the second stationary coil is activated to magnetically displace 1050 the pallet through the second magnet. The position of the pallet within the station is measured and the measuring can include reading an encoder scale on the pallet with a suitable read head arrangement.

Figure 11:
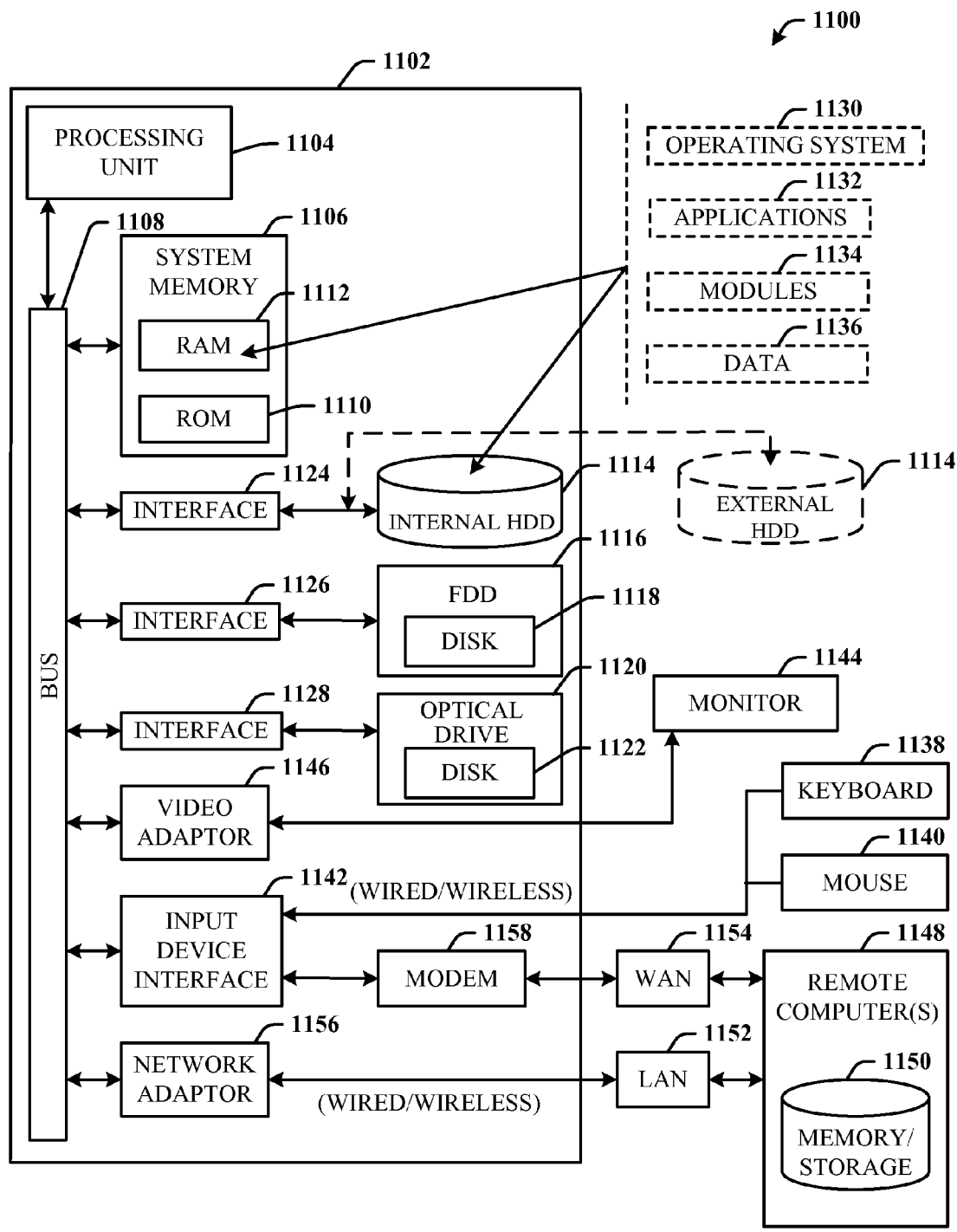
FIG. 11 illustrates a block diagram of a computer operable to execute the functions of the disclosed first, second and subsequent controllers, and the master controller

Referring now to FIG. 11, there is illustrated a block diagram of a computer operable to execute the functions of the disclosed first, second and subsequent controllers, and the master controller. In order to provide additional context for various aspects disclosed herein, FIG. 11 and the following discussion are intended to provide a brief, general description of a suitable computing environment 1100 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the various embodiments can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer typically includes other peripheral output devices (not shown), such as speakers, printers, etc.

The computer 1102 may operate in a networked environment using logical connections through wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes various embodiments. It is, of course, not possible to describe every conceivable combination of components or methodologies for purposes of describing the subject embodiments, but one of ordinary skill in the art may recognize that many further combinations and permutations of the one or more embodiments are possible. Accordingly, the detailed description is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A linear motor control system comprising:
   a linear stage, comprising a first mobile magnetic component and a second mobile magnetic component;
   a first stationary magnetic component that magnetically engages the first mobile magnetic component;
   a second stationary magnetic component that magnetically engages the second mobile magnetic component;
   a first controller to activate a first magnetic displacement between the first stationary magnetic component and the first mobile magnetic component when the linear stage is in a first range of positions; and
   a second controller to activate a second magnetic displacement between the second stationary magnetic component and the second mobile magnetic component when the linear stage is in a second range of positions.

2. The linear motor control system of claim 1, the first and second mobile magnetic components are permanent magnet assemblies and the first and second stationary magnetic components are electromagnetic coil assemblies.

3. The linear motor control system of claim 1, the first and second stationary magnetic components are elongated, parallel members, the first mobile magnetic component movably engages the first stationary magnetic component and the second mobile magnetic component movably engages the second stationary magnetic component.

4. The linear motor control system of claim 3, the first and second stationary components are longitudinally displaced so that the second stationary magnetic component has an entry end that receives the second mobile magnetic component, substantially co-extensive with an exit end for the first mobile magnetic component from the first stationary magnetic component.

5. The linear motor control system of claim 4, further comprising a position sensor that measures the position of the linear stage with respect to the first and second ranges of positions, the position sensor communicates linear stage position to the first and second controllers.

6. The linear motor control system of claim 5, further comprising a master controller that configures the first controller to deactivate the first magnetic displacement and configures the second controller to activate the second magnetic displacement when the position sensor indicates a linear stage position where the second mobile magnetic component engages the second stationary magnetic component.

7. The linear motor control system of claim 5, the position sensor comprising an encoder system that measures a longitudinal displacement of the linear stage along the first and second stationary magnetic components.

8. The linear motor control system of claim 7, the encoder system comprises a scale portion, mounted on the linear stage, and at least one stationary mounted reader head that reads the scale.

9. The linear motor control system of claim 3, the first stationary magnetic component simultaneously engages a mobile magnetic component of a predetermined number of linear stages.

10. The linear motor control system of claim 1, the linear stage comprises a conveyor pallet.

11. A conveyor system comprising:
a conveyor pallet comprising a first magnet and a second magnet;
a first coil component that engages the first magnet;
a second coil component that engages the second magnet, the second coil component is offset from the first coil component;
a first controller that electromagnetically activates the first coil component to impart a magnetic displacement to the first magnet; and
a second controller that electromagnetically activates the second coil component to impart a magnetic displacement to the second magnet.

12. A conveyor system comprising:
a conveyor pallet comprising a first magnet and a second magnet;
a first coil component that engages the first magnet, the first coil component is a stationary-mounted elongated member;
a second coil component that engages the second magnet, the second coil component is a stationary-mounted elongated member, the second coil component is offset from the first coil component;
a first controller that electromagnetically activates the first coil component to impart a magnetic displacement to the first magnet;
a second controller that electromagnetically activates the second coil component to impart a magnetic displacement to the second magnet; and
the first and second coil components are aligned in a parallel, longitudinally-displaced relationship such that the second coil component has an entry end for receiving the second magnet, substantially co-extensive with an exit end for the first magnet from the first coil component.

13. The conveyor system of claim 12, the first and second magnets are mounted to the conveyor pallet such that the second magnet engages the entry end of the second coil component as the first magnet approaches the exit end of the first coil component.

14. The conveyor system of claim 13, further comprising a master controller that configures the first controller to deactivate the first coil component and configures the second controller to activate the second coil component when the second magnet engages the second coil component.

15. A conveyor system comprising:
a conveyor pallet comprising a first magnet and a second magnet;
a first coil component that engages the first magnet;
a second coil component that engages the second magnet, the second coil component is offset from the first coil component;
a first controller that electromagnetically activates the first coil component to impart a magnetic displacement to the first magnet;
a second controller that electromagnetically activates the second coil component to impart a magnetic displacement to the second magnet; and
a position sensor that measures the position of the conveyor pallet and communicates pallet position to the first and second controllers.

16. The conveyor system of claim 15, the position sensor comprising an encoder system that measures a longitudinal length of the conveyor pallet.

17. The conveyor system of claim 16, the encoder system comprises a scale portion, mounted on the conveyor pallet, and at least one reader head, mounted stationary, for reading the scale.

18. A conveyor station comprising:
a first coil component that engages a first magnet mounted on a conveyor pallet, the first coil component is elongated and comprising an entry end and an exit end for the first magnet;
a second coil component that engages a second magnet mounted on the conveyor pallet, the second coil component is elongated and comprising an entry end and an exit end for the second magnet, the first and second coil components are aligned in a parallel, longitudinally-displaced relationship such that the second coil component entry end is substantially co-extensive with the first coil component exit end;
a first controller that electromagnetically activates the first coil component to impart a magnetic displacement to the conveyor pallet through first magnet; and
a second controller that electromagnetically activates the second coil component to impart a magnetic displacement to conveyor pallet through the second magnet.

19. The conveyor station of claim 18, the first and second coil components are stationary-mounted elongated members aligned in a parallel, longitudinally-displaced relationship such that the second coil component has an entry end for receiving the second magnet, substantially co-extensive with an exit end for the first magnet from the first coil component.

20. The conveyor station of claim 18, the first and second magnets are mounted to the conveyor pallet such that the second magnet engages the entry end of the second coil component as the first magnet approaches the exit end of the first coil component.

21. The conveyor station of claim 20, further comprising a master controller that configures the first controller to deactivate the first coil component and configures the second controller to activate the second coil component when the second magnet engages the second coil component.

22. The conveyor station of claim 18, further comprising a position sensor that measures the position of the conveyor pallet and communicating pallet position to the first and second controllers.

23. The conveyor station of claim 22, the position sensor comprising an encoder system that measures a longitudinal length of the conveyor pallet.

24. The conveyor station of claim 23, the encoder system comprises a scale portion, mounted on the conveyor pallet, and at least one reader head, mounted stationary, for reading the scale.

25. A method of conveyor operation, comprising:
   conveying a pallet into a station;
   engaging a first magnet mounted on the pallet with a first stationary coil;
   activating the first stationary coil to magnetically displace the pallet through the first magnet;
   indexing the pallet position to at least one process position through the first stationary coil;
   engaging a second magnet mounted on the pallet with a second stationary coil;
   deactivating the first stationary coil;
   activating the second stationary coil to magnetically displace the pallet through the second magnet.

26. The method of claim 25, further comprising measuring the position of the pallet within the station.

27. The method of claim 26, the measuring comprises reading an encoder scale on the pallet.

* * * * *